United States Patent [19]
Jordan

[11] Patent Number: 4,865,298
[45] Date of Patent: Sep. 12, 1989

[54] TUYERE STOCK FOR BLAST FURNACES
[75] Inventor: Peter Jordan, Cleveland, England
[73] Assignee: Davy McKee (Stockton) Limited, Cleveland, England
[21] Appl. No.: 263,796
[22] PCT Filed: Feb. 24, 1988
[86] PCT No.: PCY/GB88/00121
§ 371 Date: Oct. 21, 1988
§ 102(e) Date: Oct. 21, 1988
[87] PCT Pub. No.: WO88/06635
PCT Pub. Date: Sep. 7, 1988

[30] Foreign Application Priority Data
Feb. 25, 1987 [GB] United Kingdom ............... 8704407

[51] Int. Cl.$^4$ ............................................. C21B 7/16
[52] U.S. Cl. ............................. 266/270; 110/182.5; 285/114; 285/226
[58] Field of Search ............... 266/218, 265, 270, 287; 110/182.5; 285/41, 55, 114, 226

[56] References Cited
U.S. PATENT DOCUMENTS

| | | | |
|---|---|---|---|
| 3,980,286 | 9/1976 | Mahr et al. | 266/270 |
| 4,027,605 | 6/1977 | Legille | 266/270 |
| 4,212,253 | 7/1980 | Voituriez et al. | 266/265 |

FOREIGN PATENT DOCUMENTS

| | | | |
|---|---|---|---|
| 96198 | 12/1983 | European Pat. Off. | |
| 3221070 | 8/1983 | Fed. Rep. of Germany | |
| 1357336 | 2/1964 | France | |
| 63079 | 8/1971 | Luxembourg | |
| 70943 | 3/1975 | Luxembourg | |
| 7409146 | 1/1975 | Netherlands | 266/265 |
| 2034843 | 6/1980 | United Kingdom | |
| 2121904 | 1/1984 | United Kingdom | 266/265 |

OTHER PUBLICATIONS
Patent Abstracts of Japan, vol. 1, No. 67, 1073 c77, Jun. 1977, Appln. 52-30203, Jul. 1977.

Primary Examiner—Robert Mc Dowell
Attorney, Agent, or Firm—Lee & Smith

[57] ABSTRACT

A tuyere stock for a blast furnace comprises three pipes arranged end-to-end. Between the first and second pipes and between the second and third pipes there are flexible bellows units and a pair of links on opposite sides of the second pipe are connected at their ends through spherical bearings to the first and third pipes so as to permit relative movement between the first and third pipes in two mutually normal directions which are also normal to the longitudinal axes of the links.

6 Claims, 2 Drawing Sheets

TUYERE STOCK FOR BLAST FURNACES

This invention relates to a tuyere stock for a blast furnace. In a blast furnace, pre-heated gas, usually air, is injected into the furnace from one common supply pipe mounted around the furnace by way of a number of tuyere injection nozzles which are located on the periphery of the furnace. Each nozzle is connected to the supply pipe by what is known as a tuyere stock.

Under the effect of the high temperature of the air or gas blown into the furnace through the tuyeres, in use, the tuyere stock is subjected to considerable expansion effects. It is an object of the present invention to provide a tuyere stock in which effects due to expansion and distortion can be accommodated.

According to the present invention, a tuyere stock for a blast furnace comprises three serially arranged pipes with a first flexible bellows unit connected to the first and second pipes and a second flexible bellows unit connected to the second and third pipes and a pair of elongate links positioned on opposite sides of the second pipe and each connected at its ends through spherical bearings to the first and third pipes, respectively, thereby permitting limited movement between the first and third pipes in two mutually normal directions both of which are normal to the longitudial axes of the links.

The links, even if they are fitted with pivot bearings, as opposed to spherical bearings, would permit pivotal and lateral relative movement between the first and third pipes in a direction at right angles to the longitudinal axes of the links. By providing spherical bearings, however, lateral movement in a second direction at right angles to the first-mentioned direction is permitted in the direction normal to the longitudinal axes of the links.

Each pipe is lined with refractory material and the adjacent ends of the refractory material in the first and second pipes are of co-operating arcuate form to permit relative angular movement therebetween and the adjacent ends of the refractory material in the second and third pipes are of co-operating arcuate form to permit relative angular movement therebetween.

Furthermore, the end of the lining of the first pipe is preferably of convex arcuate form and projects into the second pipe and the end of the lining of the second pipe is of convex arcuate form and projects into the third pipe.

In order that the invention may be more readily understood, it will now be described, by way of example only, with reference to the accompanying drawings, in which.

Figure 1:
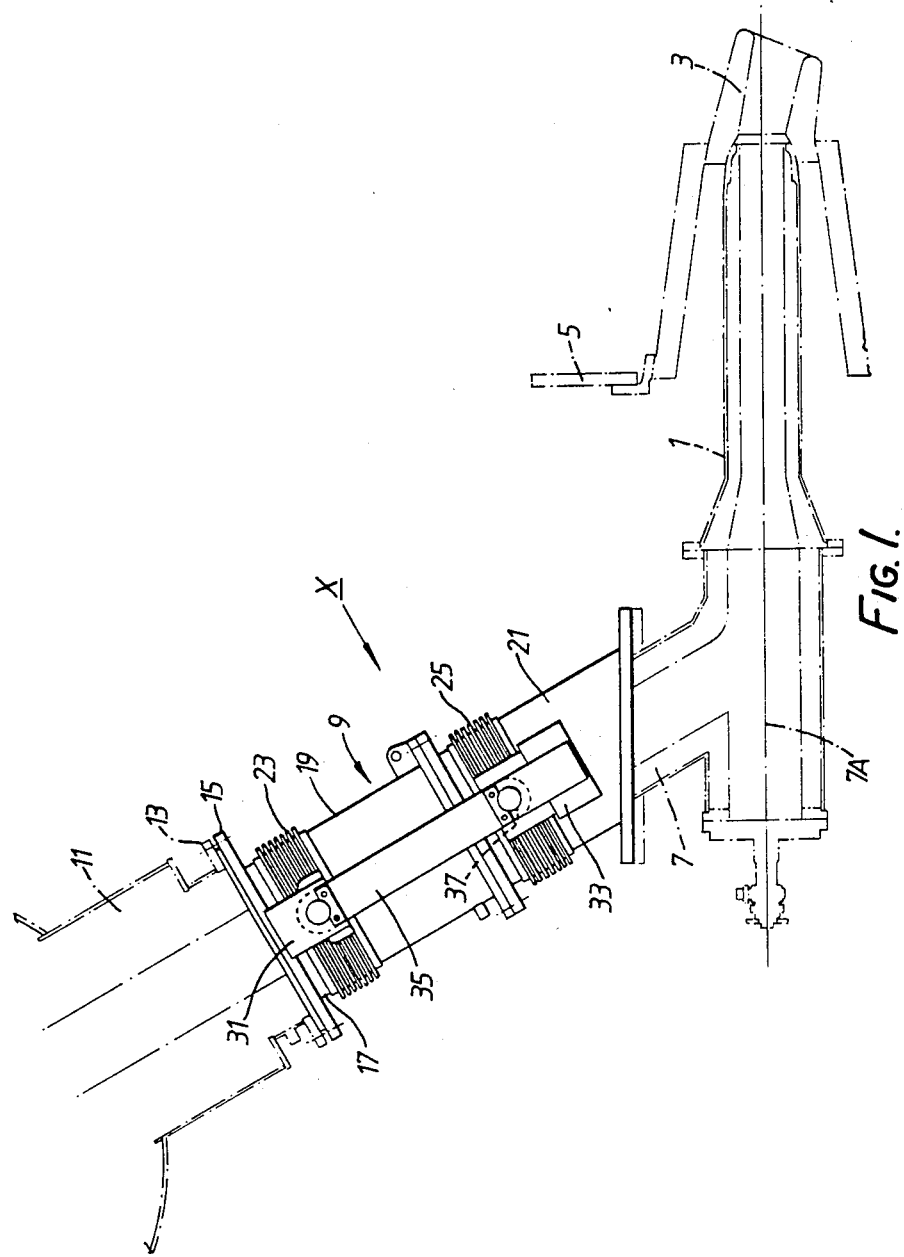
FIG. 1 is a side elevation of a tuyere stock for a blast furnace.

Referring particularly to FIG. 1, a blow pipe 1 which is urged into engagement with a tuyere 3 of a blast furnace 5 is connected through an elbow pipe 7 to the lower end of a tuyere stock 9. The upper end of the stock is connected to a manifold 11 through which hot gas, usually air, is passed. The tuyere stock enables hot high pressure air from the manifold to be injected into the tuyere 3. Clearly, in use, both in the environment surrounding a blast furnace and due to the fact that hot gas is passed through it, the tuyere stock is subjected to thermal expansions when it is in use. The portion of tuyere stock connected between the manifold 11 and the elbow 7 is sometimes referred to as the down-leg.

Figure 2:
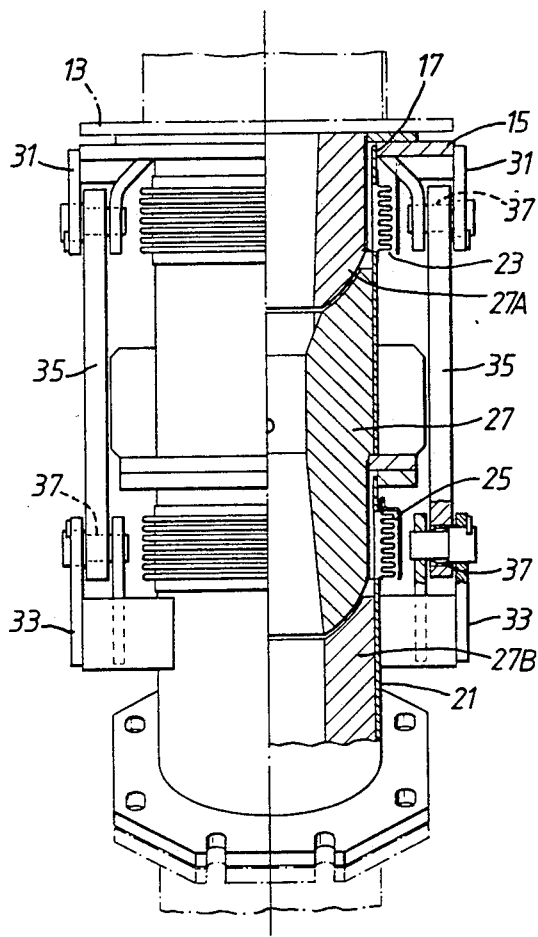
FIG. 2 is an elevation, partly in section, in the direction of the arrow X in FIG. 1.

Referring more particularly to FIG. 2, the lower end of the manifold has a flange 13 and to this is bolted a flange 15 at one end of a first axially short metal pipe 17. This pipe is arranged serially in end-to-end relation with a second metal pipe 19 and a third metal pipe 21 is in end-to-end relation with the second pipe. The adjacent ends of pipes 17, 19 are connected to opposite ends of a flexible bellows 23. Similarly, the lower end of the second pipe and the adjacent end of the third pipe are connected to opposite ends of a flexible bellows 25. The bellows permit a limited amount of relative movement between the pipes in their axial direction. The pipes are lined with refractory material 27 and adjacent ends of the refractory material have co-operating arcuate surfaces which permit one pipe to pivot to a limited extent about the pipe adjacent to it.

The end 27A of the lining of the first pipe is of convex arcuate form and projects into the second pipe and furthermore the end 27B of the lining of the second pipe is of convex arcuate form and projects into the third pipe.

A pair of brackets 31 are secured, as by welding, to the flange 15 on pipe 17 or to the pipe itself and are arranged to extend on opposite sides of the pipe 19. Similarly, a pair of brackets 33 are secured, as by welding, to opposite sides of the pipe 21. A pair of parallel elongate links 35, arranged on opposite sides of the pipe 19, are each connected at one end to a respective one of the brackets 31 and at the other end to a respective one of the brackets 33. A pin projects from each bracket through a hole in the end of the link and a spherical bearing 37 is provided between the link and the pin.

The axis 7A of the elbow pipe 7 and that of the blow pipe 1 lie in a plane which is between and parallel to the planes containing the longitudinal axes of the links 35.

This arrangement with the spherical bearings enables relative movement to a limited extent to take place between the first and third pipes in two directions which are mutually at right angles.

Referring again to FIG. 1, movement of the blow pipe 1 in the direction of its axis towards and away from the tuyere 3 is in a direction radially of the furnace 5. This movement is only accommodated because the pipe 21 can move relatively to the pipe 19 which, in turn, can move relative to the pipe 17 by a pivoting action permitted by the links 35. As the flanges 13, 15 remain fixed, the links permit the pipe 21 and, hence, the blow pipe 1 to pivot about the axes of the upper and lower ends of the links 35. Furthermore, since the bearings 37 are of spherical type, both links, while remaining parallel, are displaceable to a limited extent in a direction at right angles to their axial length which permits the blow pipe 1 to be moved in a direction tangential to the furnace 5.

It will be appreciated, therefore, that a tuyere stock in accordance with the present invention is able to accommodate expansion in the longitudinal direction of the pipes 17–21 due to the effect of the bellows, and it is also capable of movement in two mutually normal directions which are each normal to the longitudinal axes of the links.

I claim:
1. A tuyere stock for a blast furnace comprising
three serially arranged pipes;
a first flexible bellows unit connected to the first and second pipes;

a second flexible bellows unit connected to the second and third pipes;

a pair of elongate rigid links arranged parallel and positioned on opposite sides of the second pipe, each of the said links being connected at its ends to the first and third pipes, respectively;

said connections between each link and each of the first and third pipes including a spherical bearing, said links and bearings together permitting movement between the first and third pipes in each of two mutually normal directions with the links remaining parallel, both of said directions being normal to the longitudinal axis of the links.

2. A tuyere stock as claimed in claim 1, in which each pipe is lined with refractory material and the adjacent ends of the refractory material in the first and second pipes are of co-operating arcuate form to permit relative angular movement therebetween and the adjacent ends of the refractory material in the second and third pipes are of co-operating arcuate form to permit relative angular movement therebetween.

3. A tuyere stock as claimed in claim 2, in which the end of the lining of the first pipe is of convex arcuate form and projects into the second pipe and the end of the lining of the second pipe is of convex arcuate form and projects into the third pipe.

4. A tuyere stock as claimed in claim 1, in which the end of the first pipe which is remote from the second pipe carries a flange and one of the ends of the links are connected through spherical bearings to brackets secured to the flange.

5. A tuyere stock as claimed in claim 1, in which the other of the ends of the links are connected through said spherical bearings to brackets secured to the third pipe.

6. The combination of a tuyere stock as claimed in claim 1, a manifold connected to the first pipe and an elbow pipe connected to the third pipe, said elbow pipe having a longitudinal axis which lies in a plane which is between and parallel to the planes containing the longitudinal axes of the links.

* * * * *